United States Patent Office 3,717,241
Patented Feb. 20, 1973

3,717,241
TRANSPORTING APPARATUS
Shimon Arieh, Geneva, Switzerland
(% Fort Dunlop, Erdington, Birmingham 24, England)
Filed May 25, 1971, Ser. No. 146,688
Claims priority, application Switzerland, May 27, 1970,
7,868/70
Int. Cl. B65g 15/00
U.S. Cl. 198—184                                    4 Claims

ABSTRACT OF THE DISCLOSURE

A transporting apparatus in which a carrier belt is supported by gaseous pressure above a substantially flat support surface having a resilient upper surface coating.

This invention relates to transporting apparatus of the kind comprising a continuous belt moving in a closed path around end rollers at least one of which provides a drive means for the belt. The belt carries a load over a part of its length and such part provides additional support.

In known conveyors a supporting surface extends below the belt a short distance from it and a source of gaseous fluid under pressure is connected to this space. The fluid pressure is utilised to support the belt over the load bearing part of its length. Apparatus of this kind is disclosed, for example, in Swiss application No. 9923/68.

Such arrangements, however, require high pressure, large volume fluid supplies if heavy specific loads such as standing passengers are to be supported and are thus expensive to build and maintain. Furthermore due to the flexibility of the belting the effect of a concentrated load is to give rise to a marked lowering of the belt portion bearing the load and to quite a substantial lifting of the belting around the load so that it is only the loaded portion of the belt which is effectively being subjected to an upholding action from the fluid pressure.

In such an event, it is not unusual for the belt portion bearing the load to dip to the point of coming into contact with the sub-jacent supporting surface; this of course causes the frictional coefficient between the belt and this surface to increase and hence cause a power loss which becomes so much the greater when the number of people being transported on the belt is large. Further, it is obvious that repeated rubbing of the belt on the supporting surface causes premature wear of the belt and of the support.

According to one aspect of the present invention a transporting apparatus comprises a carrier belt driven around a closed path comprising at least one load carrying section, a supporting surface extending beneath the belt parallel thereto and spaced from the belt by a short distance, a source of gaseous fluid under pressure, means for conveying the fluid between the supporting surface of the belt to form a gaseous film for supporting the belt and the load it transports over the load carrying section wherein the supporting surface is provided with a resilient upper surface coating.

According to another aspect of the invention the resilient surface comprises a layer of elastically compressible synthetic foam.

One embodiment of the invention will now be described by way of example only, in conjunction with the accompanying diagrammatic drawings.

Figure 1:
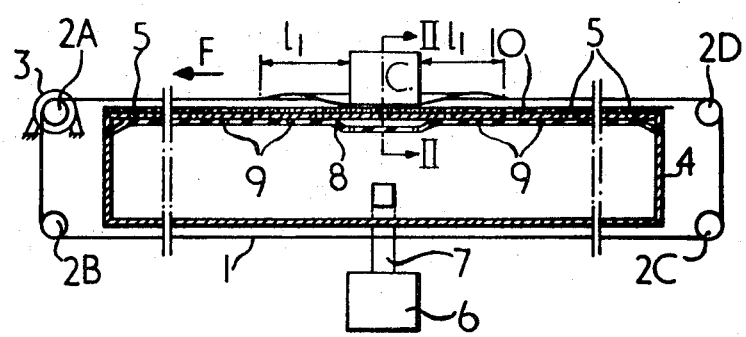
Figure 2:
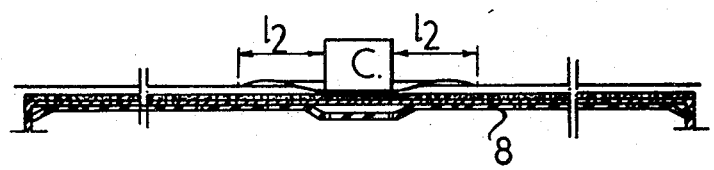
Figure 3:
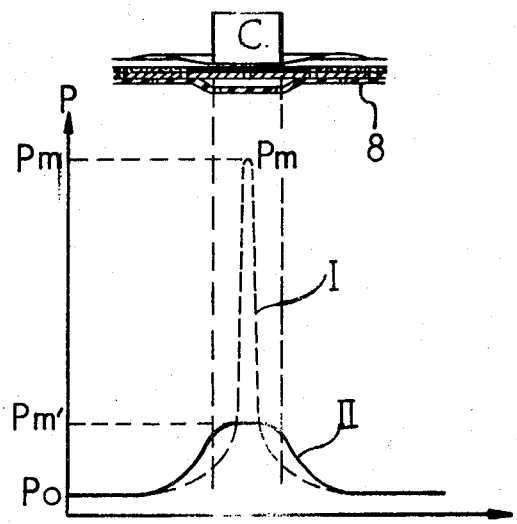
Figure 4:
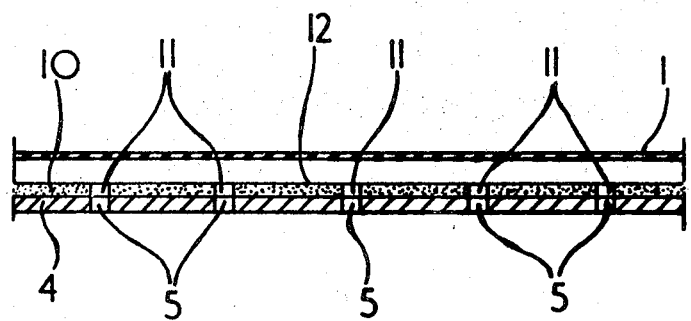

FIG. 1 is a longitudinal section of the embodiment.
FIG. 2 is a detail section along line II—II of FIG. 1.
FIG. 3 is an explanatory graph.
FIG. 4 is a partial view of FIG. 2, on a large scale, showing the relative position occupied at rest by various elements.

Figure 5:
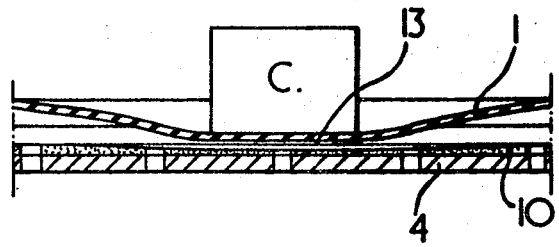

FIG. 5 is a view similar to that of FIG. 4 showing the deformations caused by the loading of the apparatus.

The illustrated transporting apparatus (FIG. 1) comprises a carrier belt 1 forming an endless loop stretched over four drums 2A, 2B, 2C, 2D of which one, 2A is controlled by a motor 3 to drive the belt lengthwise in direction F.

Between the horizontal strands of the belt 1 there is disposed a casing 4 whose upper horizontal surface, which extends near the top strand of the belt, is formed with a series of apertures 5 for the distribution of air under pressure supplied by a source 6 to which the casing is connected through the intermediary of a conduit 7.

The rate at which the air flows through the various apertures 5 in the casing is controlled by an elastic membrane 8 having its edges embedded in the side walls of the casing near the top wall thereof. This membrane is formed with a series of passages 9 arranged in quincunx in relation to the apertures 5 of casing 4 for the passage of the air under pressure from the lower part of the casing to its upper part.

It should at this point be noted that the membrane 8 remains applied to the top wall of the casing 4 as long as no object comes to lie on the part of the belt extending over the casing.

This membrane, however, unsticks, as can be seen from the drawing, as soon as such an object is laid on this belt part and throughout its displacement in direction F above the casing 4 so as to enable the air that is necessary for the formation of a gaseous object-sustaining film to be supplied beneath the latter as explained in Swiss patent application No. 9923/68 to which reference should be made for more details.

On its upper surface, the casing 4 carries a coating 10 which consists of a layer of synthetic and elastic foam stuck to the casing, and which is formed with apertures 11 in alignment with the casing apertures 5.

The upper face of the coating 10 and the side walls of apertures 11 are lined with a thin pellicle 12 of plastics material, to render the coating fluidtight.

This fluidtightness is in fact essential to enable the foam to be deformed under the action of the pressure of the air, acting on its upper surface, which is injected beneath the belt 1 through the composite apertures 5, 11 when the belt carries a load C. In the absence of a sealing pellicle 12 the injected air would merely enter the interstices of the foam without compressing the latter.

Consider the following two cases:
(a) The casing for supporting the belt and for supplying air to the sustaining film is not provided with the layer 10 of synthetic foam on its upper surface;
(b) The casing 4 is that shown in FIGS. 1 and 2 of the accompanying drawing and a layer 10 of synthetic foam is provided.

If, in the first instance, the pressure prevailing beneath the belt is measured at the level of the sectional axis II—II of FIG. 1 when the load C is in a state of sustentation, it will be observed (curve I of FIG. 3) that this pressure is at a maximum ($=P_m$) beneath the central part of the load and drops rapidly to a constant value $P_0$ (belt sustaining pressure).

This pressure $P_0$ corresponds to that which prevails underneath the part of the belt extending beyond an intermediate zone surrounding the load C the limit of which is distant by a length $L_1$, $L_2$ respectively, from the load, considered in the longitudinal direction of the belt (FIG. 1), and in a direction perpendicular to the preceding direction, respectively. In this zone, the pressure of the film passes from the value $P_m$ to the value $P_0$. Indeed, if pressure $P_0$ is the pressure at which the belt remains in equilibrium in a horizontal position, any pressure greater than $P_o$ will cause the belt to lift locally in the zone where such greater pressure prevails. This is precisely what happens in transporting apparatus having a belt sustained by a film of gaseous fluid and what is shown in FIGS. 1 and 2, in particular over the belt portions extending on opposite sides of the load C to the distances $L_1$ and $L_2$, respectively, from the load.

It follows from the above that, in the first-mentioned instance, the only portion of the belt likely to provide the load C with sustentation in a valid manner is solely that on which the load rests so that the transporting capacity of a conventionally constructed apparatus, i.e. one in which the supporting surface of the casing 4 is not provided with the layer 10, is relatively small and that it is therefore necessary to compensate for this disadvantage by supplying the sustaining film with air at a particularly high pressure.

On the other hand, by covering the upper surface of the casing 4 with the layer 10 of elastic synthetic foam, the same load C can be sustained by a gaseous film produced with air having initially a very much lower pressure.

The curve II shows how the pressure of the gaseous film formed underneath the belt 1 varies in the region of the sectional plane II—II of FIG. 1.

It will be observed from this graph that the pressure $P'_m$ is substantially constant beneath the load C and that it then decreases to a value $P_o$, at a distance $L_2$ from the load. In the longitudinal direction of the belt, the evolution of the pressure will be practically identical, i.e., pressure has a value $P_o$ at a distance $L_1$ from the load C. As can be seen from the graph of FIG. 3 the area delimited by the curve II, corresponding to the sustaining force exerted by the gaseous film on the belt, which is equal to the sustained weight plus the inherent weight of the belt portion carrying this load, is identical to that delimited by the curve I but the value of the maximum pressure is, in the second case (pressure $P'_m$) very much less than the value of the maximum pressure in the first case (pressure $P_m$).

Now, in both cases, the value of the maximum pressure ($P'_m$ or $P_m$) prevailing beneath the belt is substantially proportional, albeit less, than the value of the pressure of the air supplied to the casing 4. It follows therefore that, by covering the casing 4 with elastic synthetic foam 10, as proposed, it is possible to sustain a given load by forming the gaseous sustaining film with compressed air which initially has a pressure very much less than that it should have to sustain an identical load being transported on a belt of a transporting apparatus having a casing with no synthetic foam.

The pressure distribution corresponding to curve II in the graph of FIG. 3 is the result of having the layer 10 of synthetic foam on the upper surface of the casing 4, which layer, through being compressible, becomes deformed as shown in detail in FIG. 5 to form a kind of dished recess 13. It is to be noted that in actual practice the depth of this dished recess 13 as also the extent of the space lying between the belt 1 and the remainder of the layer 10 are very much less proportionately than as shown in the drawing, the latter only being correct as regards the illustrated principles and not as regards the dimensions of the various elements that make it up.

The maximum depth of the dished recess 13 is in its central part since the pressure of the gaseous film is at a maximum in this zone, equal to $P'_m$ (FIG. 3), and since the deformations of the foam, by compression, are directly related to the value of the pressure which cause them. The depth of the dished recess 13 decreases together with pressure value from the edge of the load and becomes practically nil at a distance $L_2$ therefrom (or $L_1$ depending on whether things are being considered transversely or longitudinally of the belt).

The law governing pressure variation underneath the belt is a function of the pressure of the air issuing from the composite apertures 5, 11 in the casing 4, of the elasticity of the synthetic foam forming the layer 10, of the thickness of this layer, of the elasticity of the belt, of the extent of the belt area occupied by the load, of the weight of this load and, to a very large extent, of the thickness of the gaseous film along the edges of the dished recess 13, which edges are located approximately at the limit of the zone surrounding the zone C to a distance $L_1$ or $L_2$, as the case may be, therefrom (FIGS. 1 and 2).

It will be appreciated that the lesser this thickness the more difficult it will be for the air from the gaseous film to escape from the space lying between the bottom of the dished recess 13 and the belt 1 and the greater will be the belt portion beneath which the film pressure, while having an intermediate value between $P'_m$ and $P_o$, decreases only slowly from the first value to the second.

It should at this point be mentioned that the extent of the belt zone that contributes to the sustentation of the load C, the limits of which have been indicated in FIGS. 1 and 2 by the distances $L_1$ and $L_2$ is dependent on the elastic characteristics of the belt and of the synthetic foam. In particular, it has been found that this zone could become very large in size when the flexion elasticity of the belt is less than the compression elasticity of the synthetic foam of layer 10.

It is further to be noted that as the belt and its load C move over the casing 4 the dished recess 13, which is formed in the synthetic foam as described, follows as it were this load, with each portion of the surface of layer 10 that comes to lie beneath the part of the belt surrounding the load (this being a zone delimited by the distances $L_1$ and $L_2$—FIGS. 1 and 2) being immediately compressed by the pressure of the gaseous film which is formed beneath the belt under the described conditions. The local extent of this compression is obviously dependent on the pressure prevailing at the particular location and at a particular time, such extent being modified in dependence on the distance which separates at each instant this location and the load C by an amount corresponding to that indicated by the curve II in FIG. 3.

Materials other than synthetic foam may be utilised for the layer. Any material which deflects under the influence of the increased pressure immediately below the load would be suitable.

I claim:

1. A transporting apparatus comprising: a carrier belt driven around a closed path comprising at least one load carrying section; a supporting surface extending beneath the belt parallel thereto and spaced from the belt by a short distance, a source of gaseous fluid under pressure; means for conveying the fluid between the supporting surface and the belt to form a gaseous film for supporting the belt and the load it transports over the load carrying section wherein the supporting surface has provided a resilient upper surface coating.

2. A transporting apparatus according to claim 1 wherein the resilient upper surface coating comprises a layer of elastically compressible synthetic foam.

3. A transporting apparatus according to claim 1 wherein the surface of the coating remote from the supporting surface is covered by a sealing pellicle.

4. A transporting apparatus according to claim 1 wherein the compression elastically of the resilient coating is less than the flexion elasticity of the belt.

References Cited
UNITED STATES PATENTS

| | | | |
|---|---|---|---|
| 3,446,332 | 5/1969 | Bechtloff | 198—165 |
| 3,583,551 | 6/1971 | Barnish | 198—184 |

RICHARD E. AEGERTER, Primary Examiner